United States Patent
Zhang et al.

(10) Patent No.: US 7,864,729 B2
(45) Date of Patent: * Jan. 4, 2011

(54) PRIORITIZED DISPLAY OF CELL BROADCAST MESSAGES

(75) Inventors: Ming Zhang, Bellevue, WA (US); Jun Shen, Redmond, CA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/619,146

(22) Filed: Nov. 16, 2009

(65) Prior Publication Data

US 2010/0062786 A1      Mar. 11, 2010

Related U.S. Application Data

(63) Continuation of application No. 11/560,418, filed on Nov. 16, 2006, now Pat. No. 7,626,962.

(51) Int. Cl.
  *H04W 4/00*      (2009.01)

(52) U.S. Cl. .................................. 370/329; 455/166.2
(58) Field of Classification Search .................. None
   See application file for complete search history.

(56) References Cited

U.S. PATENT DOCUMENTS

| | | | |
|---|---|---|---|
| 6,052,562 A * | 4/2000 | Dorenbosch | 340/7.42 |
| 6,351,656 B1 * | 2/2002 | Burgan et al. | 455/566 |
| 7,426,203 B1 * | 9/2008 | McNamara et al. | 370/338 |
| 2004/0104808 A1* | 6/2004 | Khoshbin | 340/7.5 |
| 2006/0053392 A1* | 3/2006 | Salmimaa et al. | 715/864 |
| 2006/0056394 A1* | 3/2006 | Kuure et al. | 370/352 |

* cited by examiner

*Primary Examiner*—Chirag G Shah
*Assistant Examiner*—Minh-Trang Nguyen
(74) *Attorney, Agent, or Firm*—Parks IP Law LLC; Jonathan A. Paulis

(57) ABSTRACT

Devices, systems, and methods for creating, procuring, and maintaining a priority scheme for cell broadcast messages. In an exemplary embodiment, the priority scheme includes a plurality of cell broadcast channels (CBCH) that are assigned logic groups, which in turn are assigned a priority level. Accordingly, cell broadcast (CB) messages with higher priority levels are displayed first on the receiving device.

20 Claims, 5 Drawing Sheets

PRIORITIZED DISPLAY OF CELL BROADCAST MESSAGES

CROSS REFERENCE TO RELATED APPLICATIONS

This application is a continuation of U.S. application Ser. No. 11/560,418, filed Nov. 16, 2006 now U.S. Pat. No. 7,626,962, the entirety of which is herein incorporated by reference.

TECHNICAL FIELD

The present invention relates generally to cell broadcast messaging and, more particularly, to prioritized display of cell broadcast messages on a mobile device.

BACKGROUND OF THE INVENTION

Cell broadcast is a messaging service that allows for the simultaneous delivery of messages to a group of users in a specified area. Emergency Alert Service (EAS) messages, advertisements, weather forecasts, breaking news, and sports updates can be sent to a mobile device via cell broadcast channels (CBCH). It is common for multiple cell broadcast (CB) messages of varying types to be sent to the mobile device. These CB messages are displayed on a first come, first serve basis. This display method may delay an important or urgent message from being processed and predominately displayed.

Thus, it is desirable to have devices, systems, and methods to display messages in accordance with a priority scheme such that higher priority messages are predominately displayed immediately upon receipt at the mobile device.

SUMMARY OF THE INVENTION

Devices, systems, and methods are provided herein that overcome the limitations of the prior art. More specifically, a mobile communications device provided herein includes a transceiver, a display, a processor, and a memory. The memory includes a priority scheme that includes a priority level for a number of cell broadcast channels (CBCH). The priority scheme is configured to make the processor operable to present a number of CB messages received from the CBCHs on the device display, based upon the priority level. In one embodiment, the priority scheme includes at least one logic group that is assigned a priority level.

A computer readable memory that includes instructions for making a processor operable to assign a priority level to a number of CBCHs according to a priority scheme and to present a number of CB messages received via the CBCHs on a display based upon the priority level, is also provided. In one embodiment, the priority scheme includes at least one logic group that is assigned a priority level. The priority scheme can be static or dynamic.

An over-the-air (OTA) activation system is also provided. The OTA activation system includes a wireless communications network, the wireless communications network being configured to provide OTA activation service for at least one mobile communications device that is in communication with the wireless communications network. The wireless communications network is further configured to send a priority scheme to the mobile communications device. The priority scheme includes a priority level for a plurality of CBCHs.

A method for procuring a priority scheme includes the steps of activating a wireless telecommunications service, loading a priority scheme into a mobile communications device, receiving at least two cell broadcast (CB) messages at a mobile communications device, and displaying the CB messages in an order prescribed by the priority scheme. The priority scheme is configured to prioritize a number of CB messages received from a number of CBCHs.

In some embodiments, the priority scheme is received during the step of activating. In other embodiments, the method is received before the step of activating. In still other embodiments, the method is received after the step of activating.

The priority scheme can be pre-loaded on the device by one of a manufacture, a vendor, and a wireless service provider, or programmed into a subscriber identity module (SIM). In some embodiments, the priority scheme can be dynamically updated (e.g., via OTA).

DETAILED DESCRIPTION OF THE INVENTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
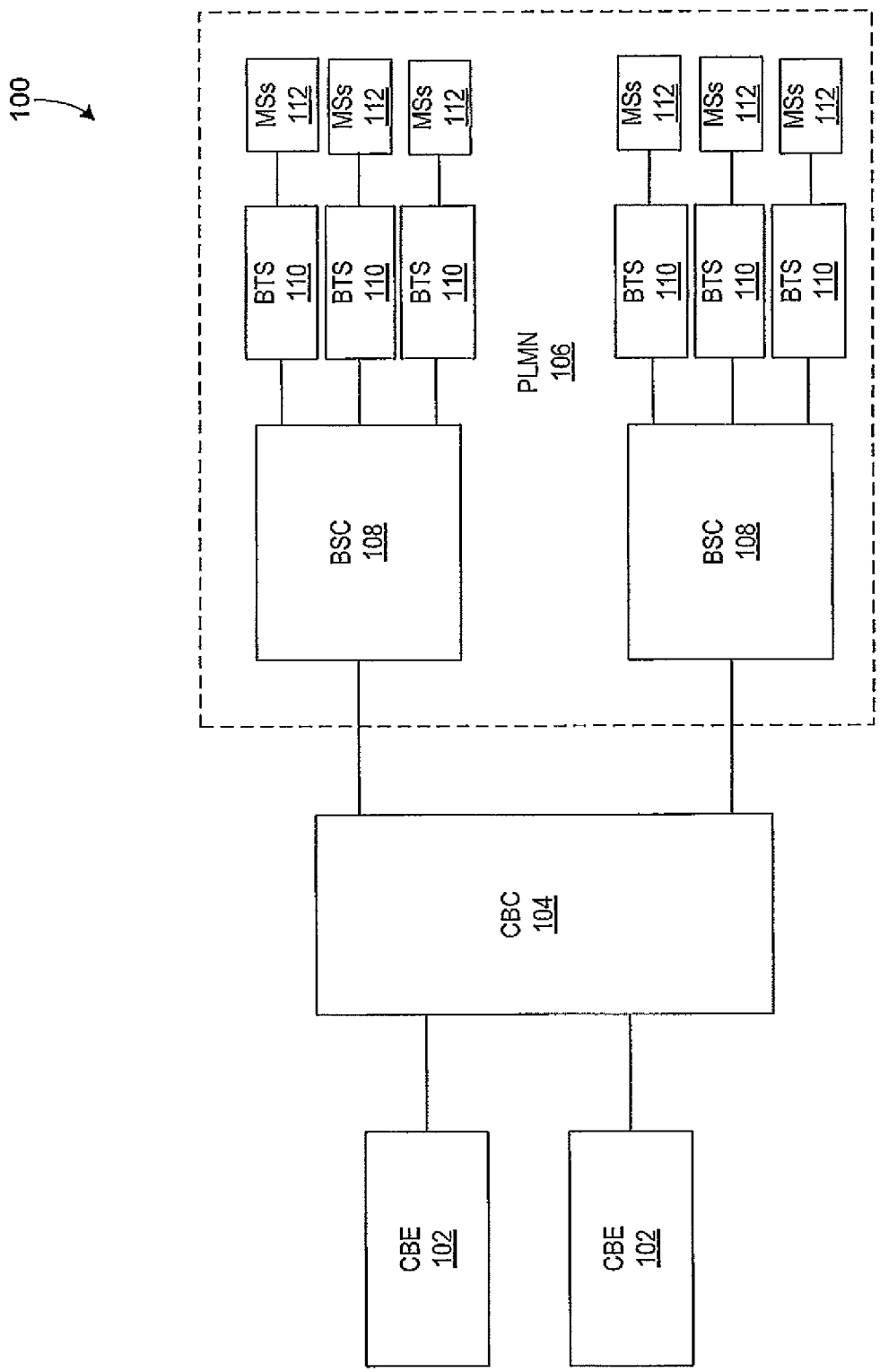
FIG. 1 illustrates a prior art cell broadcast system.

Referring now to the drawings in which like numerals represent like elements throughout the several views, FIG. 1 depicts a prior art cell broadcast system 100. The illustrated cell broadcast system 100 includes a number of cell broadcast entities (CBE) 102 that are in communication with a cell broadcast center (CBC) 104. The CBEs 102 are configured to identify the broadcast area for a CB message, provide content for the message, and otherwise format the message as is known to those skilled in the art. The CBC 104 is configured to manage the CB messages received from the various CBEs 102 and to communicate with the wireless network, for example, the illustrated Public Land Mobile Network (PLMN) 106. The CBC 104 is configured to store information corresponding to a number of Base Station Controllers (BSC) 108 and a number of Base Transceiver Stations (BTS) 110 as is known to those skilled in the art.

The illustrated PLMN 106 includes BSCs 108 that are in communication with a plurality of BTSs 110, which in turn are in communication with a plurality of mobile stations (MS) 112. The PLMN 106 may utilize any air interface known to those skilled in the art such as, but not limited to, Time Division Multiple Access (TDMA), Global System for Mobile communications (GSM), Universal Mobile Telecommunications System (UMTS), Code Division Multiple Access (CDMA), CDMA 2000, Wideband CDMA (WCDMA), and the like. For purposes of teaching and not limitation, the exemplary embodiments described herein use GSM as the air interface.

Figure 2:
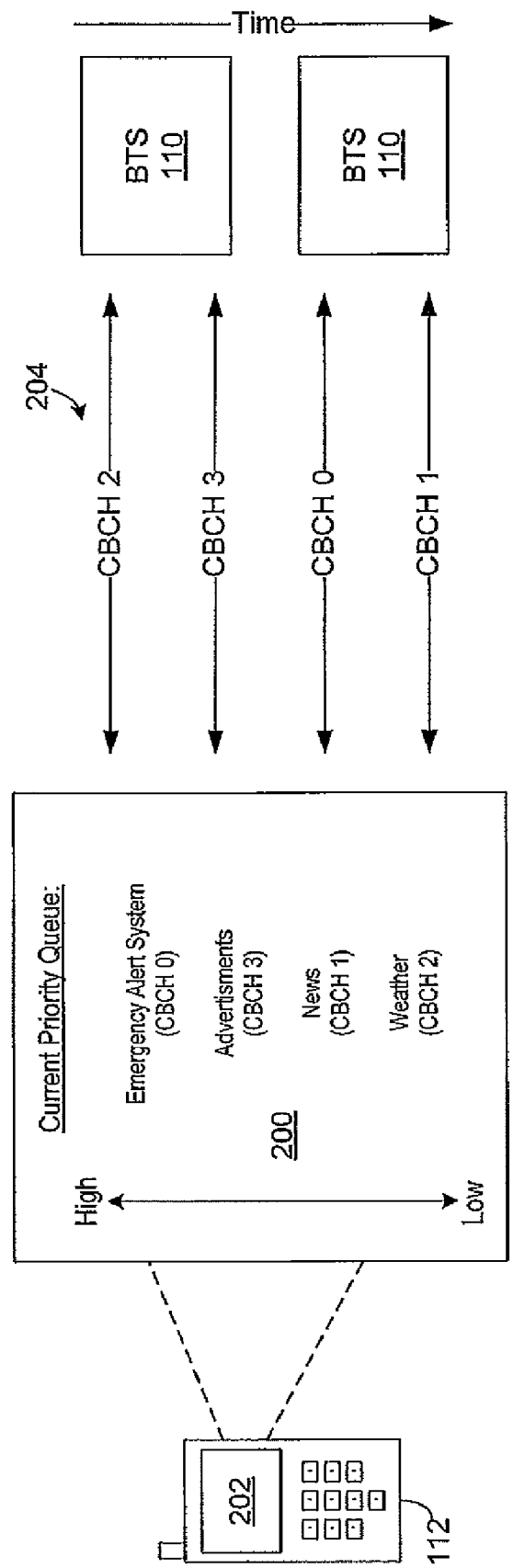
FIG. 2 illustrates an exemplary priority screen, according to the present invention.

Referring now to FIG. 2, an exemplary priority screen 200 is illustrated on display 202 of MS 112, according to the present invention. The exemplary priority screen 200 illustrates a priority order of CBCHs 204 as prescribed by a CBCH priority scheme stored within the MS 112. It is contemplated that the CBCH priority scheme can be stored in a memory of the MS 112. The memory can be, for example, a read-only memory (ROM), a random access memory (RAM), or a hybrid combination thereof. In addition, the memory can be internal, external, and/or removably insertable into the MS 112.

The CBCHs 204 are transmitted from the BTSs 110 with CBCH 2 being transmitted first, followed by CBCH 3, CBCH 0, and finally CBCH 1. It is assumed that the MS 112 receives the CBCHs 204 in the same order. As is known to those skilled in the art, present cell broadcast systems are configured to display CB messages in order of receipt and regardless of message content. The priority screen 200, however, utilizes a priority scheme to enable the display of CB messages based at least in part upon message content.

The priority screen 200 illustrates the current priority queue, wherein the CBCHs are ranked CBCH 0, CBCH 3, CBCH 1, and CBCH 2 in accordance with the illustrated CBCH priority scheme. In this example, the CBCHs 204 include messages with content related to emergencies, advertisements, news, and weather. Other content types are contemplated as are other priority schemes.

In the illustrated embodiment, a message sent via the Emergency Alert System (EAS) via CBCH 0 is displayed first in the priority queue. In the known prior art implementations, this message would be displayed after weather on CBCH 2 and advertisements on CBCH 3.

Figure 3:
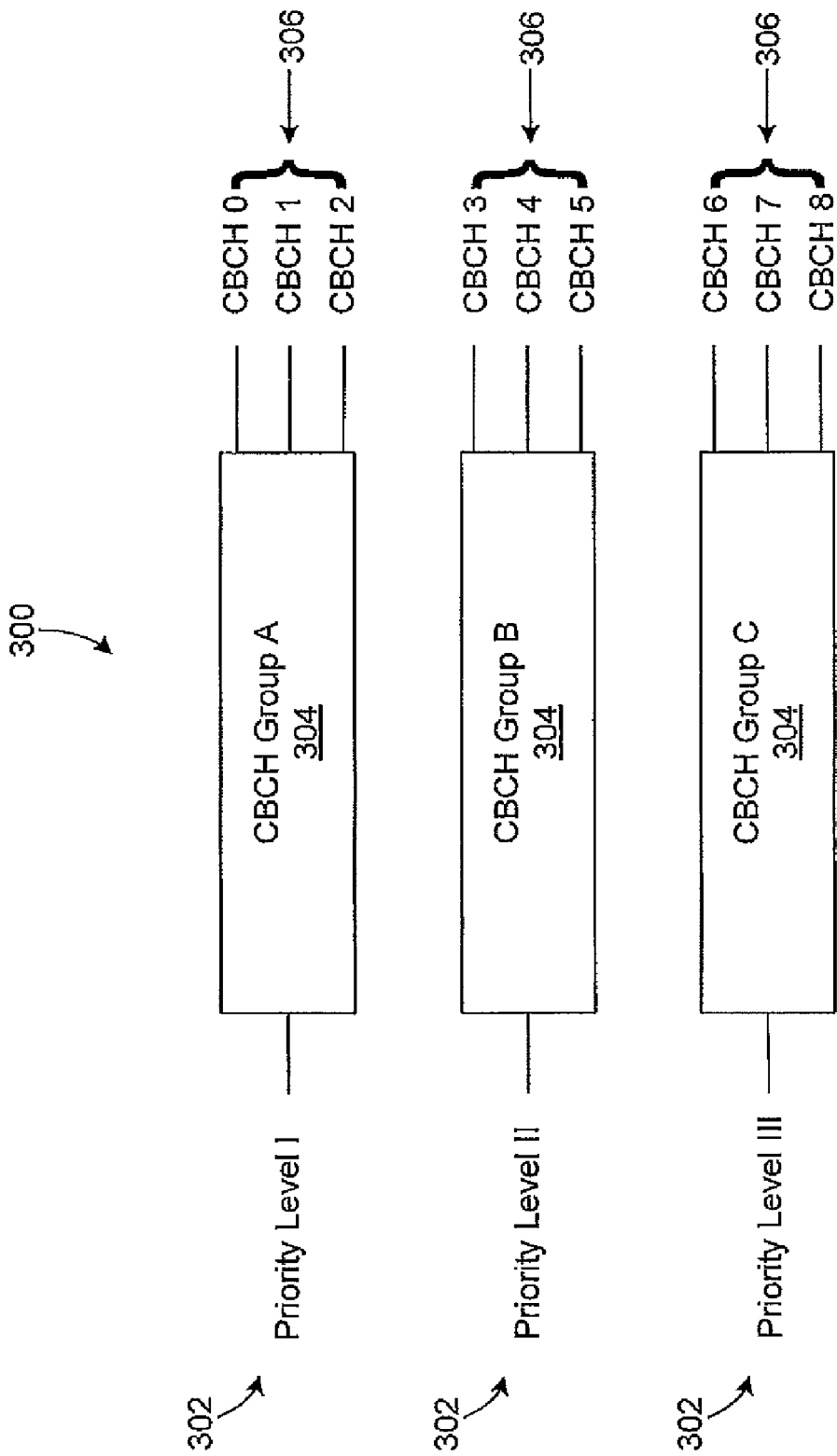
FIG. 3 illustrates an exemplary priority scheme, according to the present invention.

Referring now to FIG. 3, an exemplary priority scheme 300 is shown, according to the present invention. The illustrated priority scheme 300 includes a priority level 302 that is associated with a CBCH logic group 304, which in turn is associated with a number of CBCHs 306. In one embodiment, the CBCH groups 304 are defined by the content of the CBCHs 306 such that CBCHs 306 with like content are associated with the same logic group. Each logic group is then assigned a different priority level.

The priority scheme 300 can be static or dynamic. In an exemplary static priority scheme, priority levels are assigned to each of the subscribed CBCHs. A CB message transmitted on a priority level I CBCH can be displayed first in accordance with the priority scheme, regardless of the message content. A dynamic priority scheme, however, can be configured to update the priority levels and/or group assignments based upon a variety of factors such as, but not limited to, a message content identifier in the CB message header (e.g., a cell broadcast message identifier (CBMI)). Accordingly, the CB message header is used to determine the content of the transmitted CB message. The content type is compared to the content type currently associated with the serving CBCH. If the message content identifier provides a content type not currently in record for the serving CBCH, then the dynamic priority scheme is updated for the new content type. Subsequent messages sent via this CBCH are then considered valid message types. It is contemplated that algorithms may be employed that can determine when it is appropriate to delete a content type. This can be determined by a sampling of the X most recent CB messages transmitted on the CBCH in question. Other methods for updating the priority levels of the CBCHs are contemplated.

The priority scheme 300 can be defined by the wireless service provider and/or the wireless subscriber. In some embodiments, software can be developed to allow the wireless subscriber to create and/or customize one or more priority schemes from the subscriber's MS. In other embodiments, the service provider can generate and send the priority scheme and/or priority scheme updates to the subscriber's MS. In still other embodiments, the priority scheme is pre-loaded in a memory of the MS by one of a manufacturer, vendor, or service provider prior to or at the point of sale of the MS. In still further embodiments, the priority scheme is programmed into the Subscriber Identity Module (SIM).

It is contemplated that access settings can be implemented so as to regulate subscriber access to the priority scheme and thus prevent unwanted changes. For example, government regulations, service provider preferences, or the like may require emergency messages to be displayed first. Thus, a setting can be used to prevent a subscriber from changing the priority scheme to display other information such as news, weather, sports scores, advertisements, and the like from being displayed before a higher priority emergency message.

Figure 4:
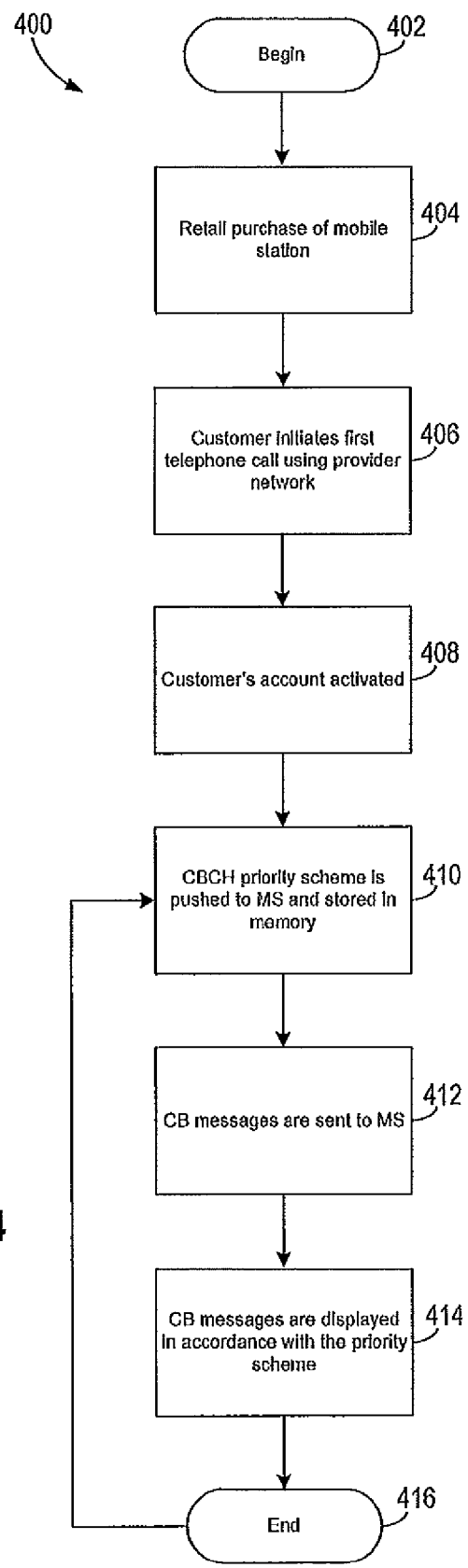
FIG. 4 illustrates an exemplary method for procuring a priority scheme via Over-the-Air (OTA) activation, according to the present invention.

Referring now to FIG. 4, an exemplary method 400 for procuring a priority scheme via over-the-air (OTA) activation is shown, according to the present invention. It should be understood that the steps illustrated with regard to FIG. 4 are not limited to the order shown.

The exemplary method 400 begins at step 402. Following the retail purchase of a mobile station at step 404, the customer initiates a telephone call using the provider network, as shown in step 406. The customer is then prompted to complete a number of steps to activate a new account. At step 408, the customer's account is activated. The method then proceeds to step 410, wherein a CBCH priority scheme is pushed to the MS 112 and stored in a memory thereof.

It is contemplated that, in some embodiments, the provider network can send priority scheme updates to the MS 112. As previously described, the priority scheme can be configured to dynamically update based upon the CB message content type.

At step 412, CB messages are sent to the MS 112. The MS 112 receives and displays the CB messages on a display 202 in accordance with the priority scheme at step 414. The method ends at step 416. In some embodiments, the priority scheme may be updated and as such, the method would proceeds back to step 410, wherein the updated priority scheme is pushed to the MS 112 and stored in a memory.

Figure 5:
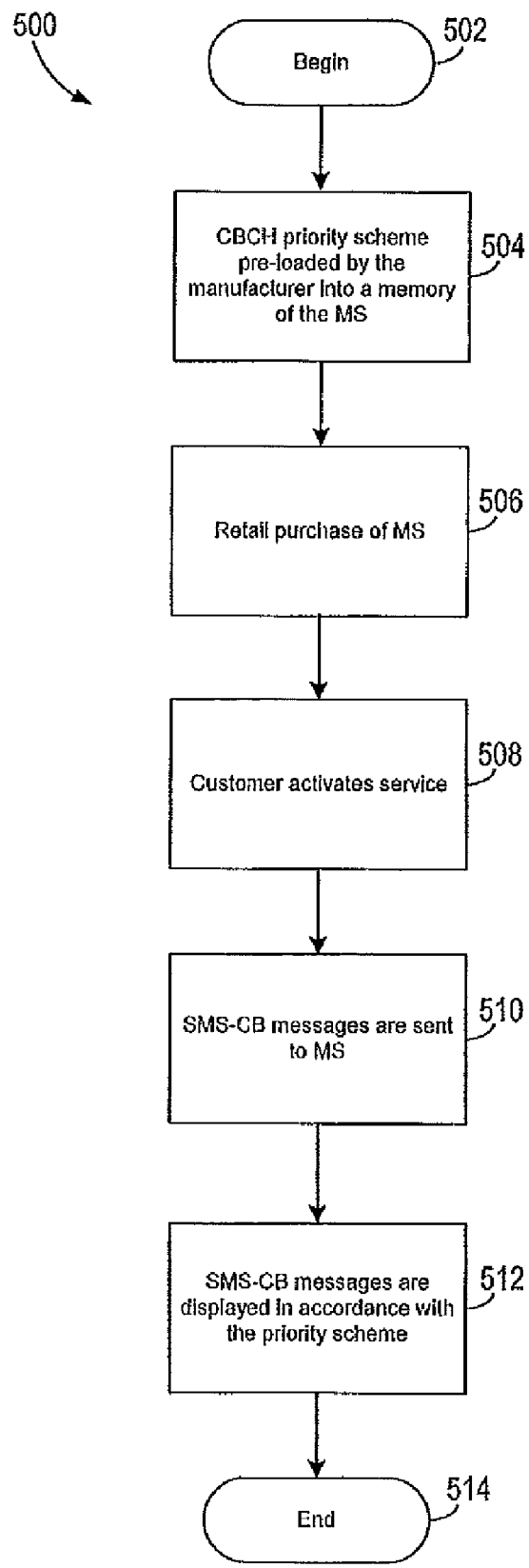
FIG. 5 illustrates an exemplary method for procuring a priority scheme via manufacture pre-load, according to the present invention.

Referring now to FIG. 5, an exemplary method 500 for procuring a priority scheme via pre-load is shown, according to the present invention. It should be understood that the steps illustrated with regard to FIG. 5 are not limited to the order shown.

The exemplary method 500 begins at step 502 and proceeds to step 504, wherein a CBCH priority scheme is pre-loaded into a memory of the MS 112. The priority scheme can be pre-loaded by the MS 112 manufacturer, by the MS vendor, or by the wireless service provider.

Following the retail purchase of a MS at step 506, the customer can activate service via any method known to those skilled in the art at step 508. Common examples include in-store account activation and OTA activation. After the customer's account is activated, the method 500 proceeds to step 510.

At step 510, CB messages are sent to the MS 112. The MS 112 receives and displays the CB messages on a display 202 in accordance with the priority scheme at step 512. The method ends at step 514.

In an alternative embodiment, the SIM can be programmed with one or more priority schemes.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method for prioritizing cell broadcast messages for presentation on a display of a mobile communications device in accordance with a dynamic priority scheme, the method comprising:
    loading the dynamic priority scheme into a memory of the mobile communications device, the dynamic priority scheme comprising at least two logic groups, each of which is assigned a priority level and each of which includes a plurality of cell broadcast channels (CBCHs), wherein each CBCH is associated with at least one of a plurality of message content types;
    receiving, at the mobile communications device, a cell broadcast message via a serving CBCH of the CBCHs, the cell broadcast message comprising message content and a cell broadcast message header with a message content identifier used to identify the message content as one of the plurality of message content types;
    determining, at the mobile communications device, based upon the message content identifier, a received message content type of the message content;
    comparing, at the mobile communications device, the received message content type to all message content types currently associated with the serving CBCH;
    determining, at the mobile communications device, that the received message content type is not currently associated with the serving CBCH; and
    updating, at the mobile communications device, the dynamic priority scheme to associate the received message content type with the serving CBCH.

2. The method of claim 1, further comprising:
    receiving, at the mobile communications device, at least two subsequent cell broadcast messages via the CBCHs; and
    displaying, on the display of the mobile communications device, the subsequent cell broadcast messages in an order prescribed by the dynamic priority scheme.

3. The method of claim 1, further comprising receiving, at the mobile communications device, the dynamic priority scheme during an over-the-air (OTA) activation sequence.

4. The method of claim 1, wherein loading the dynamic priority scheme into the memory of the mobile communications device comprises pre-loading the dynamic priority scheme into the memory of the mobile communications device.

5. The method of claim 4, wherein pre-loading the dynamic priority scheme into the memory of the mobile communications device comprises the dynamic priority scheme being pre-loaded into the memory of the mobile communications device by a manufacturer, a vendor, or a wireless service provider.

6. The method of claim 1, wherein loading the dynamic priority scheme into the memory of the mobile communications device comprises loading the dynamic priority scheme into a subscriber identity module (SIM).

7. The method of claim 1, wherein the mobile communications device operates in a Global System for Mobile communications (GSM) network that supports cell broadcast messaging in accordance with a GSM standard.

8. The method of claim 1, wherein the mobile communications device operates in a Universal Mobile Telecommunications System (UMTS) network that supports cell broadcast messaging in accordance with a UMTS standard.

9. The method of claim 1, wherein the mobile communications device operates in a Code Division Multiple Access (CDMA) network that supports cell broadcast messaging in accordance with a CDMA standard.

10. A non-transitory, computer-readable memory of a mobile communications device operating in a wireless network, the computer-readable memory comprising computer-executable instructions for making a processor operable to:
    load the dynamic priority scheme into the computer-readable memory, the dynamic priority scheme comprising at least two logic groups, each of which is assigned a priority level and each of which includes a plurality of cell broadcast channels (CBCHs), wherein each CBCH is associated with at least one of a plurality of message content types;
    receive, via a transceiver of the mobile communications device, a cell broadcast message via a serving CBCH of the CBCHs, the cell broadcast message comprising message content and a cell broadcast message header with a message content identifier used to identify the message content as one of the plurality of message content types;
    determine based upon the message content identifier, a received message content type of the message content;
    compare the received message content type to all message content types currently associated with the serving CBCH;
    determine that the received message content type is not currently associated with the serving CBCH; and
    update the dynamic priority scheme to associate the received message content type with the serving CBCH.

11. The non-transitory, computer-readable memory of claim 10, wherein the wireless network includes a Global System for Mobile communications (GSM) network that supports cell broadcast messaging in accordance with a GSM standard.

12. The non-transitory, computer-readable memory of claim 10, wherein the wireless network includes a Universal Mobile Telecommunications System (UMTS) network that supports cell broadcast messaging in accordance with a UMTS standard.

13. The non-transitory, computer-readable memory of claim 10, wherein the wireless network includes a Code Division Multiple Access (CDMA) network that supports cell broadcast messaging in accordance with a CDMA standard.

14. The non-transitory, computer-readable memory of claim 10, wherein the non-transitory, computer-readable memory further comprises instructions for making the processor operable to:
    receive, via the transceiver of the mobile communications device, at least two subsequent cell broadcast messages via the CBCHs; and
    instruct a display of the mobile communications device to present the subsequent cell broadcast messages in an order prescribed by the dynamic priority scheme.

15. The non-transitory, computer-readable memory of claim 10, wherein the non-transitory, computer-readable memory further comprises instructions for making the processor operable to receive, via the transceiver of the mobile communications device, the dynamic priority scheme during an over-the-air (OTA) activation sequence.

16. The non-transitory, computer-readable memory of claim 10, wherein the computer-readable memory comprising computer-executable instructions for making the processor operable to load the dynamic priority scheme into the memory of the mobile communications device comprises instructions for making the processor operable to pre-load the dynamic priority scheme into the memory of the mobile communications device.

17. The non-transitory, computer-readable memory of claim 10, wherein the computer-readable memory comprising computer-executable instructions for making the processor operable to load the dynamic priority scheme into the memory of the mobile communications device comprises instructions for making the processor operable to load the dynamic priority scheme into a subscriber identity module (SIM).

18. A mobile communications device operating in a wireless network that supports cell broadcast messaging, the mobile communications device comprising:
   a transceiver for receiving cell broadcast messages from the wireless network;
   a display for displaying the cell broadcast messages received from the wireless network;
   a memory comprising instructions for making a processor operable to:
      load a dynamic priority scheme into the memory, the dynamic priority scheme comprising at least two logic groups, each of which is assigned a priority level and each of which includes a plurality of cell broadcast channels (CBCHs), wherein each CBCH is associated with one of a plurality of message content types;
      receive, via the transceiver, a cell broadcast message via a serving CBCH of the CBCHs, the cell broadcast message comprising message content and a cell broadcast message header with a message content identifier used to identify the message content as one of the plurality of message content types;
      determine based upon the message content identifier, a received message content type of the message content;
      compare the received message content type to all message content types currently associated with the serving CBCH;
      determine that the received message content type is not currently associated with the serving CBCH; and
      update the dynamic priority scheme to associate the received message content type with the serving CBCH.

19. The mobile communications device of claim 18, wherein the memory further comprises instructions for making the processor operable to:
   receive, via the transceiver, at least two subsequent cell broadcast messages via the CBCHs; and
   instruct the display of the mobile communications device to present the subsequent cell broadcast message in an order prescribed by the dynamic priority scheme.

20. The mobile communications device of claim 18, wherein the memory further comprises instructions for making the processor operable to receive, via the transceiver, the dynamic priority scheme during an over-the-air (OTA) activation sequence.

* * * * *